United States Patent

Aye et al.

[11] Patent Number: 5,886,675
[45] Date of Patent: Mar. 23, 1999

[54] AUTOSTEREOSCOPIC DISPLAY SYSTEM WITH FAN-OUT MULTIPLEXER

[75] Inventors: Tin M. Aye, Mission Viejo; Tomasz P. Jannson, Torrance; Andrew Kostrzewski, Garden Grove; Gajendra D. Savant, Torrance, all of Calif.

[73] Assignee: Physical Optics Corporation, Torrance, Calif.

[21] Appl. No.: 498,423

[22] Filed: Jul. 5, 1995

[51] Int. Cl.⁶ .................................. G09G 5/00
[52] U.S. Cl. ........................ 345/7; 345/9; 348/51
[58] Field of Search .................. 345/7, 8, 9, 6, 345/5, 4, 87; 348/51, 52, 53, 54, 55, 56, 57, 58, 59

[56] References Cited

U.S. PATENT DOCUMENTS

| | | | |
|---|---|---|---|
| 3,479,111 | 11/1969 | Gabor | 352/44 |
| 4,799,739 | 1/1989 | Newswanger | 350/3.7 |
| 4,926,412 | 5/1990 | Jannson et al. | 370/3 |
| 4,964,684 | 10/1990 | Iovine | 350/3.76 |
| 5,001,555 | 3/1991 | Park | 348/51 |
| 5,187,597 | 2/1993 | Kato et al. | 359/22 |
| 5,191,449 | 3/1993 | Newswanger | 359/22 |
| 5,198,913 | 3/1993 | Toyoda et al. | 359/7 |
| 5,202,793 | 4/1993 | Auge | 359/463 |
| 5,225,861 | 7/1993 | Marks | 353/7 |
| 5,245,448 | 9/1993 | Waits | 359/4 |
| 5,260,814 | 11/1993 | Smith et al. | 359/23 |
| 5,274,478 | 12/1993 | Yang | 359/15 |
| 5,333,071 | 7/1994 | Ishikawa et al. | 359/15 |
| 5,365,354 | 11/1994 | Jannson et al. | 359/15 |
| 5,365,370 | 11/1994 | Hudgins | 359/464 |
| 5,371,627 | 12/1994 | Baccei et al. | 359/462 |
| 5,379,133 | 1/1995 | Kirk | 359/15 |
| 5,396,349 | 3/1995 | Roberts et al. | 359/14 |
| 5,404,234 | 4/1995 | Taniguchi et al. | 359/15 |
| 5,410,421 | 4/1995 | Huignard et al. | 359/15 |
| 5,418,631 | 5/1995 | Tedesco | 359/15 |

Primary Examiner—Xiao Wu

[57] ABSTRACT

An autostereoscopic display system including: I) image signal electronics; II) a first projector including: A) a first light source 33; B) a first spatial light modulator 35 optically connected to said first light source and electrically connected to said image signal electronics; and C) a first image delivery system optically connected to said first spatial light modulator; III) a second projector connected to said first projector, said second projector including: A) a second light source 34; B) a second spatial light modulator 36 optically connected to said second light source and electrically connected to said image signal electronics; and C) a second image delivery system optically connected to said second spatial light modulator; IV) a fan-out multiplexer 39 optically connected to both said first image delivery system and said second image delivery system, said fan-out multiplexer being characterized by a viewing zone period and a viewing region period; and V) a binary head tracker 40 electrically connected to said image signal electronics, said binary head tracker including a camera 42 and a circuit board. The system provides the capability for real-time autostereoscopic display together with an impressive look-around feature.

12 Claims, 12 Drawing Sheets

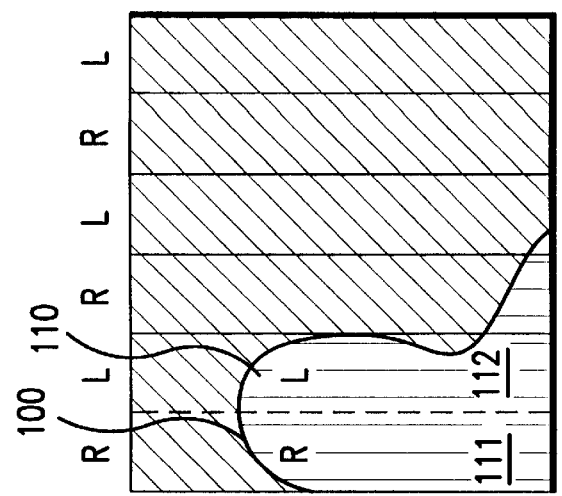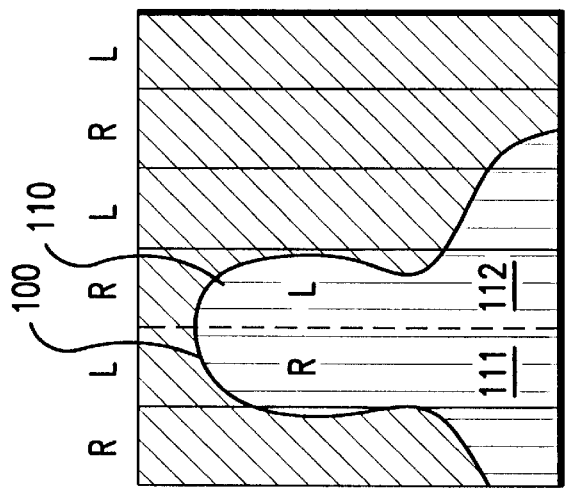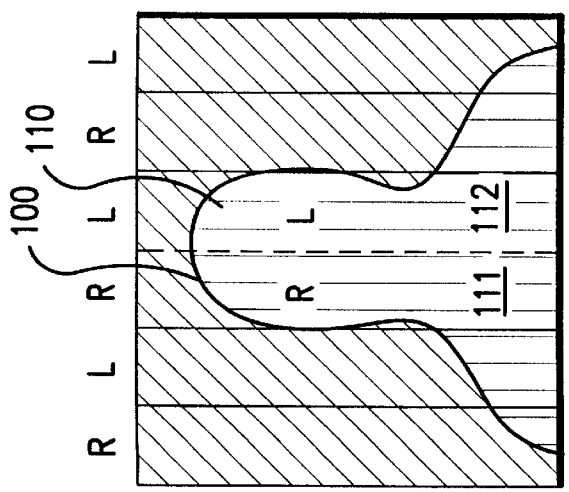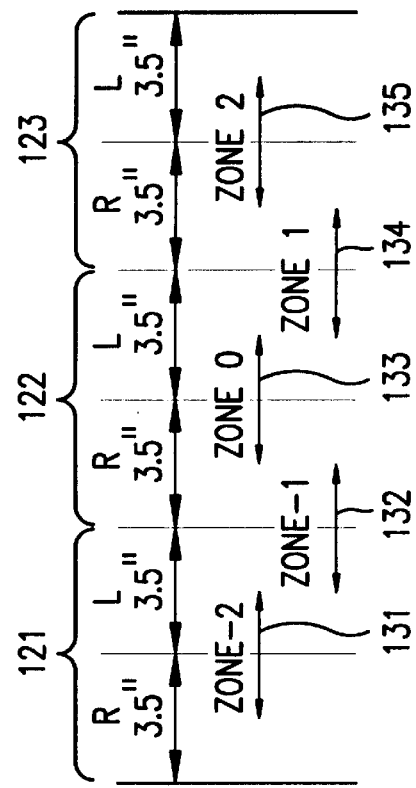

NON-UNIFORM STRUCTURE
AFTER PROCESSING

VERTICAL GRATING CONTANST
NON-UNIFORMATY

AUTOSTEREOSCOPIC DISPLAY SYSTEM WITH FAN-OUT MULTIPLEXER

BACKGROUND OF THE INVENTION

1. Field of the Invention

The present invention relates generally to the field of three dimensional (3-D) displays. More particularly, the present invention concerns 3-D displays that do not require the viewer to wear goggles or glasses. The present invention thus relates to 3-D display systems of the type that can be termed autostereoscopic.

2. Discussion of the Related Art

Stereo vision is based on the perception of depth. Stereo display systems are based on the most dominant depth cue (i.e., parallax), which is defined as the angular separation between corresponding points of left and right perspective images. In this respect, human 3-D vision does not require "real" 3-D information, since the human brain has contact with only two 2-D retinal images, neither of which preserve z-axis (i.e., depth) information. This third dimension is reconstructed only in the brain. Therefore, 3-D displays can be based on capturing and displaying a 2-D left image and a 2-D right image in order to replicate the corresponding left and right retinal images.

In many technical fields, 3-D displays can provide scientists and technicians with the ability to better interpret the physical parameters of an image being displayed. 3-D display techniques have been attempted in the past, but have suffered from the need for the observer to wear external devices, the loss of real-time display capabilities, a lack of full screen resolution, the need for heavy computation and special formatting, very high cost, and/or any combinations of the above. A truly practical device must be able to interface with conventional 2-D display systems in order to increase vendor acceptance, provide real-time capabilities for interactive applications, and provide 3-D look around capabilities without special viewing glasses. In addition, a cost effective production method must be established to make the device attractive for commercial markets.

As noted above, stereoscopic displays provide an observer with parallax depth cues. This is done by presenting each eye with a view of an object from a different perspective viewpoint. When the difference between these viewpoints approximates normal interocular separation, an impression of viewing an actual solid object is created. Conventionally, some form of viewing device, such as glasses, is required to channel a different view into each eye. This is quite effective in presenting a three dimensional impression, and it requires only twice the amount of image data compared to a two dimensional view. The major drawback is the need to wear a device or to peer into eyepieces. This has led to many years of effort to provide directly viewable (i.e., stereoscopic without glasses) or, more precisely, autostereoscopic images.

Autostereoscopic displays create a "window" through which an unaided observer can view what appears to be a solid object. This is a very natural and desirable situation from the standpoint of the observer, but involves two substantial technical challenges. First, the light rays leaving the display must be directed so that each of the observer's eyes receive a complete but different image. Second, images of the object from a range of viewpoints must be presented simultaneously. There may be as few as two perspective views, but typically four or more are required to provide a range of viewing positions (scenes). This greatly increases the amount of image data which must be managed.

Holographic displays and lenticular photographs are the most familiar examples of autostereoscopic images. Holographic displays (or holograms) are an interferometric pattern of a recorded object which can be reconstructed by a collimated beam.

Recently, considerable interest has been directed toward autostereoscopic techniques which are based on the multiplex carrier method. This is because of the simplicity, practicality, and potential low cost of this approach. This technique provides a limited look-around 3-D effect if more than two perspectives are projected into the viewing eyebox. If the number of perspectives is low enough, images may be generated and displayed in real-time because the data processing demands can be satisfied. However, in this technique, the image projection area must be divided into two separate parts, which significantly reduces the image's spatial resolution. Further, this technique has additional drawbacks, because it requires sequential scanning of N perspectives (N>1) for each vertical scan line. The line feed rate R to the multiplexed monitor is related to the flicker-free line rate r by R=N×r. Thus, the feed signal rate is increased two or more times relative to the rate necessary for a monocular monitor.

The disclosures of all the below-referenced prior United States patents in their entireties are hereby expressly incorporated by reference into the present application for purposes including, but not limited to, indicating the background of the present invention and illustrating the state of the art. U.S. Pat. No. 3,479,111 discloses a three-dimensional picture projection. U.S. Pat. No. 4,799,739 discloses real time autostereoscopic displays using holographic diffusers. U.S. Pat. No. 4,926,412 discloses a high channel density wavelength division multiplexer with defined diffracting mean positioning. U.S. Pat. No. 5,365,354 discloses a GRIN type diffuser based on volume holographic material.

SUMMARY OF THE INVENTION

The present invention is directed to an autostereoscopic 3-D display system that has a capability for real-time autostereoscopic display together with an impressive look-around feature. The present invention uses a projection system that includes a fan-out multiplexer (FOM). The FOM includes N volume holograms, where $N \geq 2$. Each volume hologram provides one of a plurality of perspective viewing zones. Each volume hologram includes n, where $n \geq 2$, (e.g., 2, i.e., left and right), diffuse perspective regions. Thus, each volume hologram provides n diffuse perspective regions within a single perspective viewing zone. The plurality of perspective viewing zones provides the look-around feature. Due to the high angular Bragg selectivity of volume holograms, many volume holograms (i.e., large N) may be recorded in a single photosensitive material with high efficiency and without crosstalk. Additionally, the system can be provided with full color capability by either multiplexing 3 primary colors, (e.g., red, green, blue (RGB)) during reconstruction or by using dispersion compensating compound multiplexed holograms.

It is therefore an object of the invention to provide an angularly multiplexed fan-out diffuser projection screen as part of an autostereoscopic display system. Another object of the invention is to provide an apparatus that is ruggedized and reliable, thereby decreasing down time and operating costs. Another object of the invention is to provide an apparatus that has one or more of the characteristics discussed above but which is relatively simple to manufacture and assemble using a minimum of equipment.

In accordance with a first aspect of the invention, these objects are achieved by providing an autostereoscopic display system comprising: I) image signal electronics; II) a first projector including: A) a first light source 33; B) a first spatial light modulator 35 optically connected to said first light source and electrically connected to said image signal electronics, said first spatial light modulator defining a first spatial light modulator normal axis 37; and C) a first image delivery system optically connected to said first spatial light modulator; III) a second projector connected to said first projector, said second projector including: A) a second light source 34; B) a second spatial light modulator 36 optically connected to said second light source and electrically connected to said image signal electronics, said second spatial light modulator defining a second spatial light modulator normal axis 38, said second spatial light modulator normal axis being spatially multiplexed apart from said first spatial light modulator normal axis to define a spatial light modulator separation distance; and C) a second image delivery system optically connected to said second spatial light modulator; IV) a fan-out multiplexer 39 optically connected to both said first image delivery system and said second image delivery system, said fan-out multiplexer being characterized by a viewing zone period and a viewing region period; and V) a binary head tracker 40 electrically connected to said image signal electronics, said binary head tracker including a camera 42 and a circuit board. In one embodiment, said first spatial light modulator normal axis and said second spatial light multiplexer normal axis converge toward said fan-out modulator.

Another object of the invention is to provide a method of recording an angularly multiplexed fan-out diffuser projection screen. Another object of the invention is to provide a method that is predictable and reproducible, thereby decreasing variance and operating costs. Another object of the invention is to provide a method that has one or more of the characteristics discussed above but which is which is relatively simple to setup and operate using relatively low skilled workers.

In accordance with another aspect of the invention, these objects are achieved by providing a method of recording a fan-out multiplexer comprising: I) providing a recording plate 270, said recording plate including a photosensitive material; II) illuminating said photosensitive material with a first converging reference beam 274 at a first reference beam angle; III) illuminating said photosensitive plate with a first object beam 273 at a first object beam angle; and IV) illuminating said photosensitive plate with a second object beam at a object beam second angle, the arc subtended by said first object beam angle and said second object beam angle being a function of a viewing zone period. In one embodiment, said fan-out multiplexer is recorded by: illuminating said photosensitive material with said first object beam at said first object beam angle; and then illuminating said photosensitive material with a second object beam at a second object beam angle.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification: wherein, like reference numerals designate the same elements in the several views, and in which:

FIGS. 9A, 9B and 9C illustrate a sequence of head tracker input images according to the present invention;

FIG. 10 illustrates a schematic view of three five overlapping viewing zones according to the present invention;

DESCRIPTION OF PREFERRED EMBODIMENTS

The present invention and the various features and advantageous details thereof are explained more fully with reference to the non-limiting embodiments described in detail in the following description.

1. System Overview

To meet the requirements listed above, the present invention uses a 3-D display based on a stationary FOM. The FOM is an angularly multiplexing screen. This stationary screen is a holographic diffuse screen (HDS) that is uses volume multiplexed holographic optical element (HOE) technology and a twin projection system. The screen focuses a stereoscopic 3-D pattern from two projectors into an observer's eyes, without the need for polarization glasses or focusing lenses.

The screen is recorded using a plurality of object beams. During the process of recording, the screen can be exposed to one object beam at a time or to more than one object beam at a time. Each of the object beams defines an angle with regard to the screen that is function of a desired viewing zone period. The number of viewing positions is equal to the number of object beams.

The viewing area closely resembles a regular TV projection screen. This approach creates an impression of natural 3-D vision. The screen combines the properties of a regular projection TV screen with holographically improved and multiplexed focusing lenses. The resulting screen still looks like a normal TV projection screen, but it focuses a multiplicity of projector beams (containing fullmotion-stereoscopic patterns) into the viewers' eyes, across the full screen area, and for each beam.

The right eye and left eye information must be separated by a distance that is equal to the average distance between human eyes (approximately 3"). Each viewing region is confined to a scalar range of approximately 3", (i.e., the viewing region period). It is possible to replicate left and right eyes data in adjacent regions as shown in FIGS. 1A and 1B.

Figure 1A:
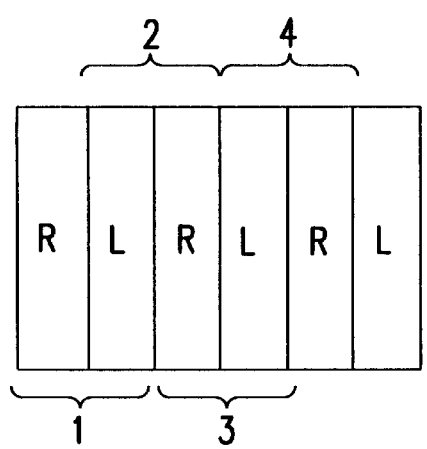
FIGS. 1A and 1B illustrate schematic views of an autostereoscopic display according to the present invention.
Figure 1B:
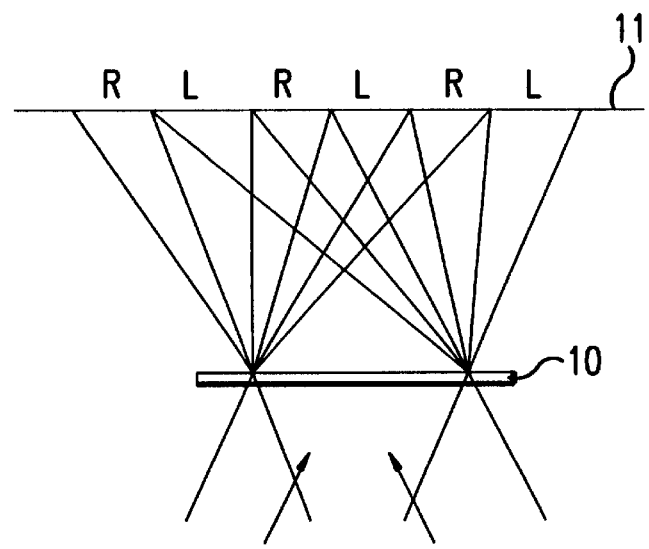

FIGS. 1A and 1B illustrate left and right eye data multiplexing where FIG. 1A is a side view, and FIG. 1B is a top view. The replication upon playback is accomplished by a FOM 10 providing angular fan-out of both the right and left eye information. If the viewer moves in the plane parallel to the screen 11, the viewer will always have left and right eye information presented to his eyes.

However, there will be instances that left eye will see right eye information while right will see left eye information. To solve this problem, a simple head tracking device together with an electric multiplexer capable of switching left or right channel information is provided.

Figure 2:
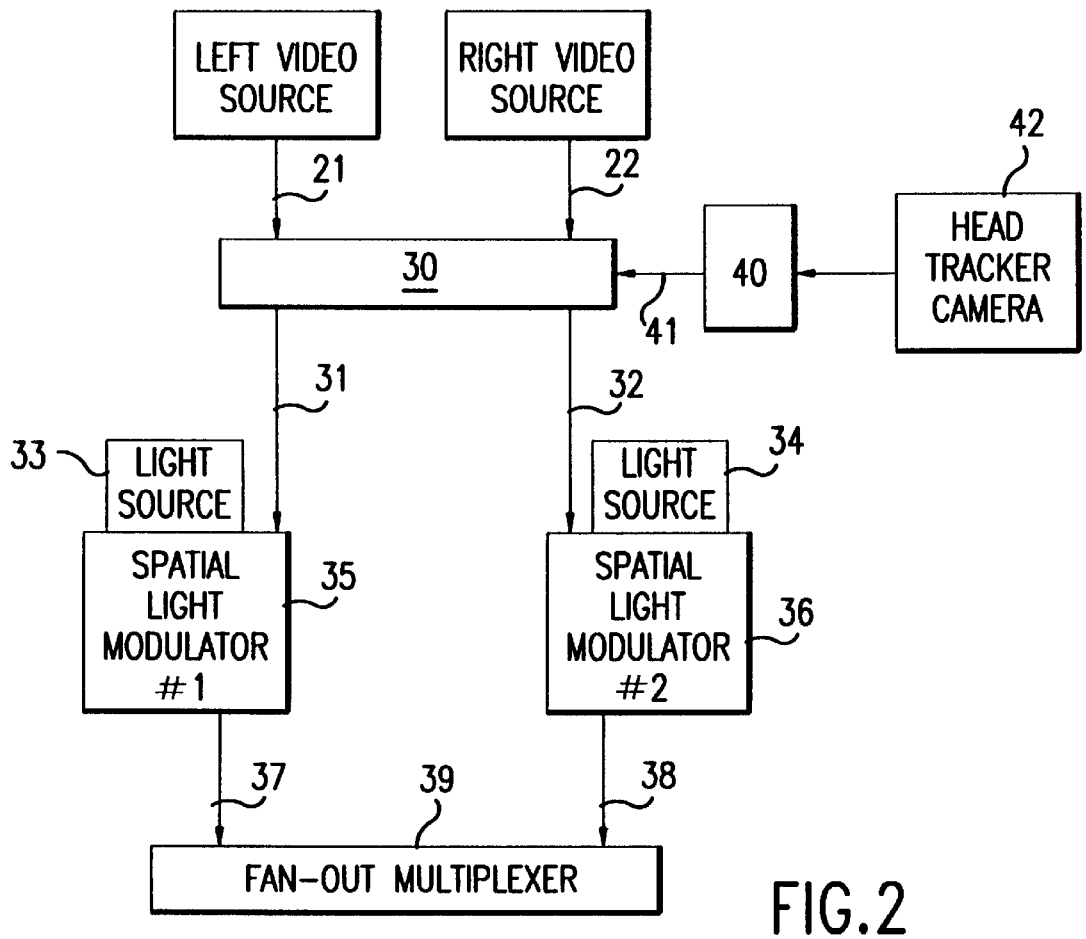
FIG. 2 illustrates a block schematic view of a display system according to the present invention.

A block diagram of the system is shown in FIG. 2. The input data (e.g., 2 channels, 21, 22 one for right and one for left data) enters the electric multiplexer switch 30. The electric multiplexer switch 30 redirects the left and right eye information depending on the output of the binary head tracker 40. The #1 output 31 of the electric switch 30 can carry either left or right eye information. Similarly, the #2 output 32 can carry either right or left information.

The binary head tracker 40 classifies the viewer head position by emitting as output a "0" if the left eye is located within a left (left input) region. Conversely, a "1" is output in the case of mismatch.

Figure 3:
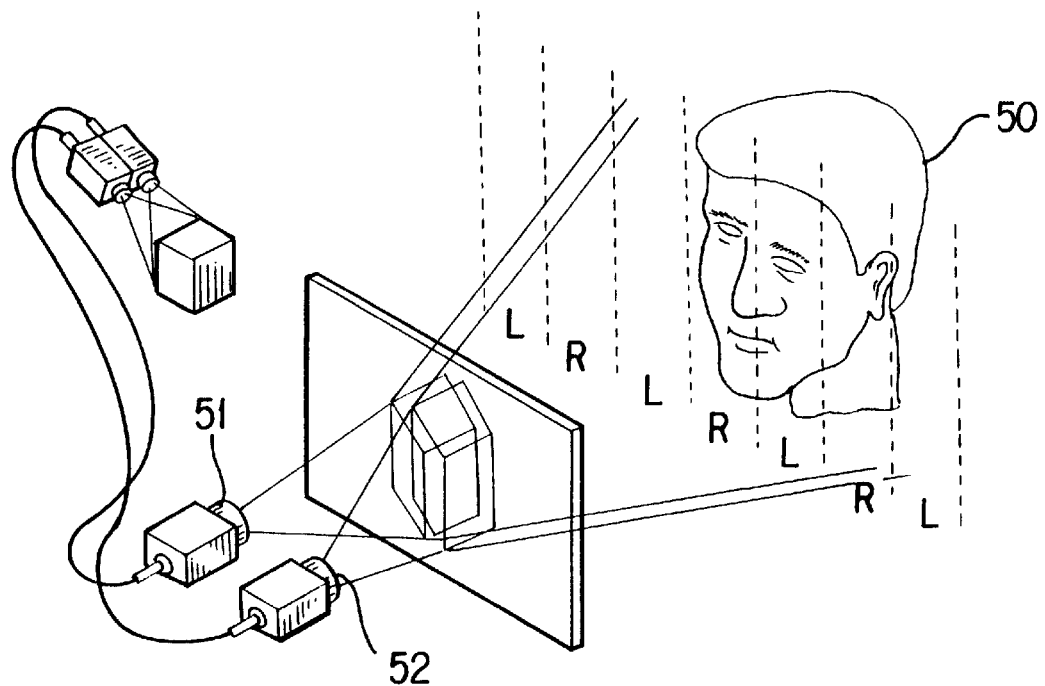
FIG. 3 illustrates a perspective schematic view of an autostereoscopic display system according to the present invention.

The electric multiplexer 30 will switch the left and right eye information according to the signal 41 from the binary head tracker 40. If the binary head tracker 40 output is "0" then left video data is provided to the #1 output 31 and right video data is provided to the #2 output 32. If the binary head tracker output is "1" then the data is reversed (i.e., right data is switched to output #1 31 and left data is switched to output #2 32). Such multiplexing should be done faster than the frame rate (e.g., approximately 30 milliseconds). If the viewer 50 moves as shown in FIG. 3, the left and right eye channels are switched again so that left video data is provided to the #1 output 31 and right video data is provided to the #2 output 32.

In this way, the present invention produces high resolution, high quality full color stereoscopic 3-D images with look-around capability. The number of viewing zones, N, can be relatively high (N=from approximately 10 to approximately 100). As a practical matter, N is only limited by the number of 2-D projectors and/or the projector frame rate(s). The ability to confine light to specific view regions achieves brighter images with lower illumination power. The absence of polarizers or shutters (which alter the color content or chromaticity of projected scenes) eliminates the dimming of images. High diffraction efficiency Bragg angular and wavelength selectively ensures clear left and right images with very low crosstalk. The present invention is adaptable to different geometries, either reflection or transmission. The present invention is scalable, from desk top to very large screen sizes. Light weight and compact screens can be designed (polycarbonate substrate with 20–50 $\mu$m thick holographic film). Fabrication and replication by contact copying are low cost and simple. Moreover, the present invention is compatible with familiar 2-D display formats.

In order to facilitate 3-D stereoscopic multiple viewing, N diffused holographic projection holographic optical elements can be recorded (multiplexed) on the same recording plate by using two reference beam directions corresponding to the two projection beam angles in recording. (It should be noted that a single reference beam direction can be used if the reconstruction beams converge with regard to one another.) The minimum separation of the angles is determined by the Bragg angular selectivity of the recording medium. Due to the Bragg selectively, the view regions will be reconstructed without noticeable crosstalk. Since stereoscopic vision requires two perspective views of an object, a parallax image of the original object will be seen if the viewer's left and right eyes are within the appropriate zones.

This concept of 3-D stereoscopic viewing is not limited to static projection or monochromatic images. It can be used for real time, dynamic full color images, such as those from video cameras, computer graphics, and film. The Bragg multiplexibility of volume holograms allows for the recording of many perspective view regions (i.e., N>20). This will provide true 3-D look-around capability into a wide field of view (FOV).

This approach can also provide true color display. Wavelength multiplexing of the three primary colors RGB for each perspective is possible. This would provide full color capability by using dispersion compensation of a compound holographic multiplexing involving two specially designed holographic optical elements.

2. Autostereoscopic Screen

To enhance the appreciation of the advantages of the present invention, the fundamental differences between holographic projection and holographic imaging are outlined below. In a preferred approach, holographic projection and not holographic imaging is proposed. Thus, many of the restrictions imposed by holographic imaging do not apply to the present invention. For example, when a broadband white light is used for projection, projection holography produces sharp images without the blurring caused by chromatic dispersion seen in holographic imaging.

Holographic imaging typically uses a two-step process. During the first step, a stationary object is recorded through the use of two coherent laser beams.

According to basic holographic principles, the exact volume replica of the object can be reconstructed if the reconstruction and recording conditions are exactly identical. Therefore, at least in principle, a 3-D holographic cinema could be achieved by recording stationary sequences of a moving scene. However, the practical problems are overwhelming. Still, it is possible to create computer generated images and to recall them by using special modulation and addressing techniques using extensive computer processing.

Holographic projection, on the other hand, records the holographic analog of an imaging lens in thin (e.g., approximately 20 microns) high resolution holographic material. As in the case of a thin lens, a 2-D image of an object can be projected by illuminating the hologram with a reconstruction beam (conjugate to the reference beam in recording) modulated by the object's transmittance (e.g., the transmittance of a colored transparency).

Due to the directional nature of the HOE, a viewer sees only part of the image, within a very narrow angular range. Additionally, 3-D images cannot be projected. Thus, simple projection HOEs cannot be used for 3-D viewing purposes. It should be noted that a similar analysis holds for transmission HOEs, where R and O (i.e., reference and object beams) are on the same side of the hologram plane.

The present invention uses simple, conventional projection systems combined with a holographic diffuse screen (HDS) and is based on multiplexed volume holographic optical element (HOE) technology. The display screen consists of N (N≧2) volume holograms of diffuse perspective regions, one for each perspective view zone, multiplexed in a thin film volume of material, each recorded with a reference beam angle corresponding to either one of the two projection beam angles. By projecting the corresponding perspectives of a scene simultaneously along these reference directions, a spatial sequence of perspective views is reconstructed in these viewing zones simultaneously, providing a 3-D scene to the viewer. Due to the high angular Bragg selectivity of volume holograms, many holograms (large N) may be recorded with high efficiency and without crosstalk. Additionally, full color capability can be provided by using dispersion compensating compound multiplexed holograms.

A salient feature of the present invention is that the volume holographic screen is stationary, with no sequential switching elements; thus no flickering occurs. Due to volume hologram Bragg selectivity, the entire screen area is used simultaneously for both left and right perspectives. This overcomes the serious limitation on the number of perspectives due to greatly increased image data, which is inherent in the methods previously discussed. Thus, with the present invention, the image resolution is fully preserved (i.e., not reduced by the partitioning of the screen). Because the present invention is easily scalable, it can be immediately adapted to large displays with currently available liquid crystal television (LCT) technology. The system design is straightforward and is based on conventional video projection technology. Therefore, it can interface easily with state-of-the-art liquid crystal display systems including active matrix liquid crystal displays (AMLCD), and it does not require any special video formatting of data.

Figure 4:
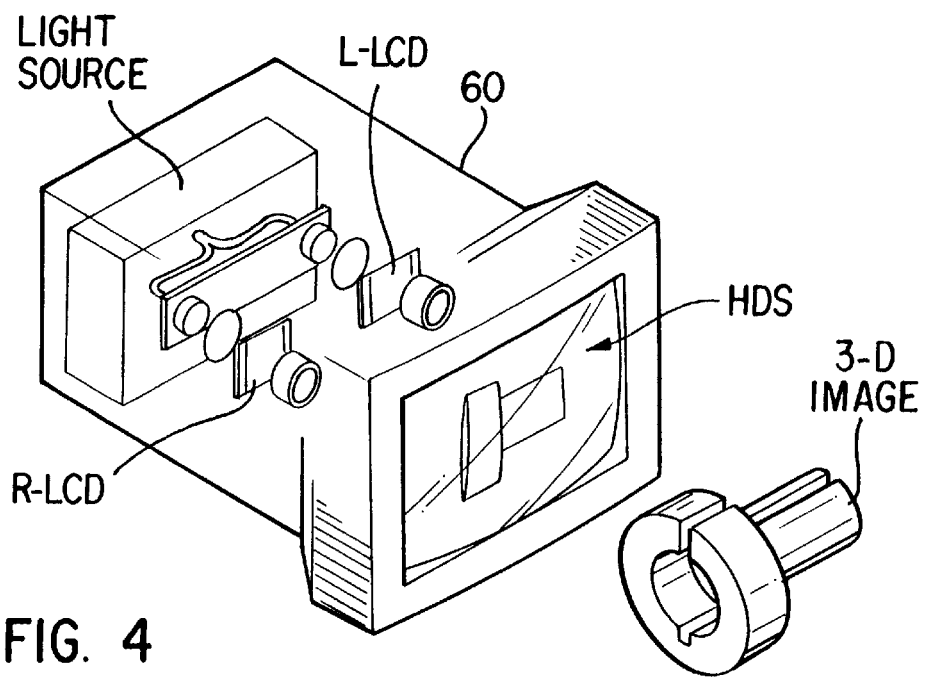
FIG. 4 illustrates a perspective schematic view of a monitor that includes an autostereoscopic display system according to the present invention.

The present invention extends this 3-D display technology to produce practical commercializable prototype systems. The present 3-D holographic real time display system is illustrated in FIG. 3 and FIG. 4. Both transmission and reflection holograms may be used for the holographic screen. Various refinements will be made for head movement, rotation, and space saving projections with distortion corrections.

FIG. 3 is an illustration of the present real time autostereoscopic 3-D holographic display concept. Each set of holograms diffracts light from the appropriate view projector 51, 52 to the corresponding (L or R) view regions. FIG. 4 illustrates a compact system packaged with a computer monitor 60.

Figure 5:
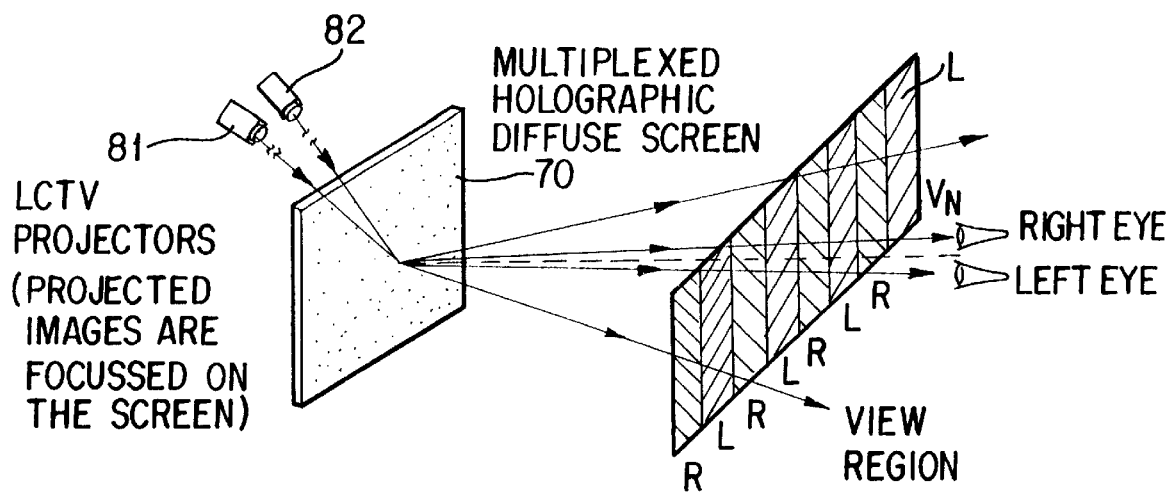
FIG. 5 illustrates a perspective schematic view of a fan-out multiplexer according to the present invention.
Figure 6:
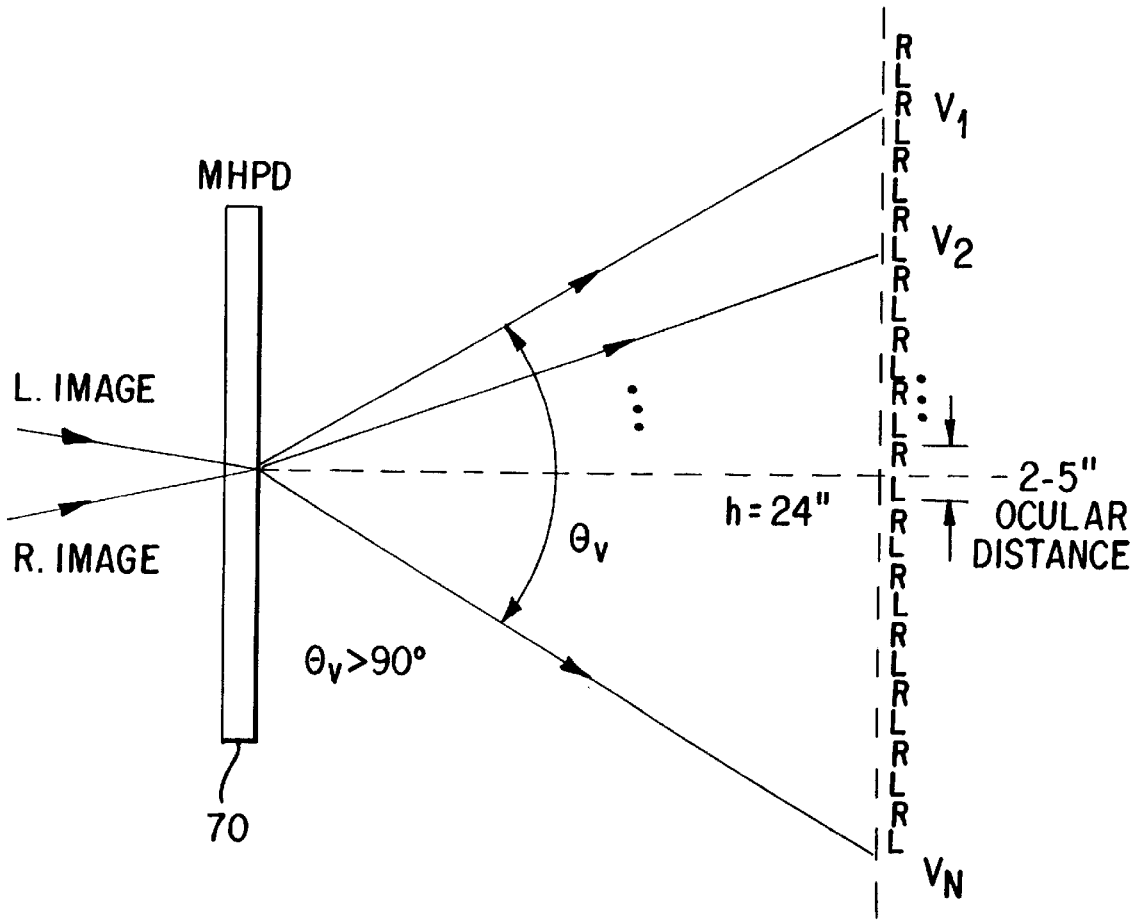
FIG. 6 illustrates a schematic top view of a fan-out multiplexer according to the present invention.

Each of the views is duplicated in periodic fashion as shown in FIG. 5 and FIG. 6. These L and R channels provide full 3-D visual capability. Additionally, the binary head tracker will provide necessary channel switching if the viewer's head is moved from the original viewing zone. For full color display, a hologram 70 with wide vertical dispersion can be used. The hologram 70 diffracts light from the appropriate view projector 81, 82 to the corresponding (L or R) view regions. FIG. 6 is a top view showing that the viewing region period (i.e., ocular distance) can be selected to be from approximately 2 to approximately 5 inches.

Figure 7:
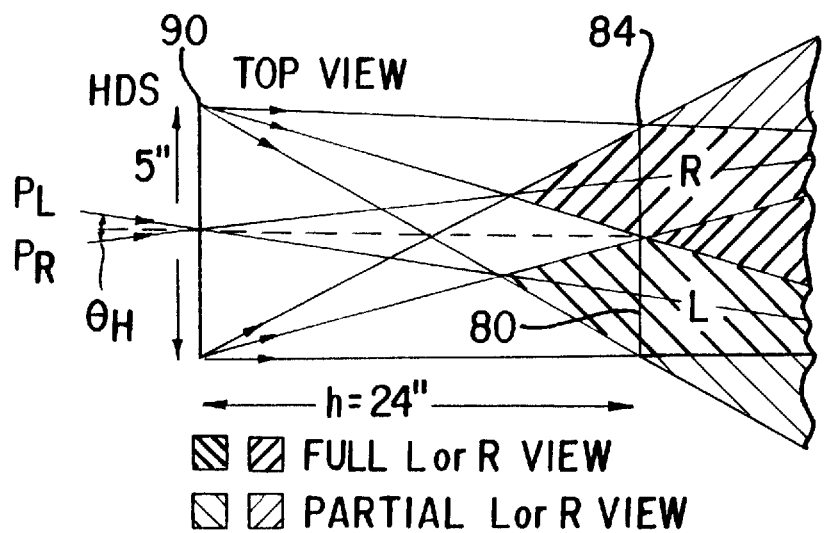
FIG. 7 illustrate schematic top view of a viewing zone geometry according to the present invention.
Figure 8:
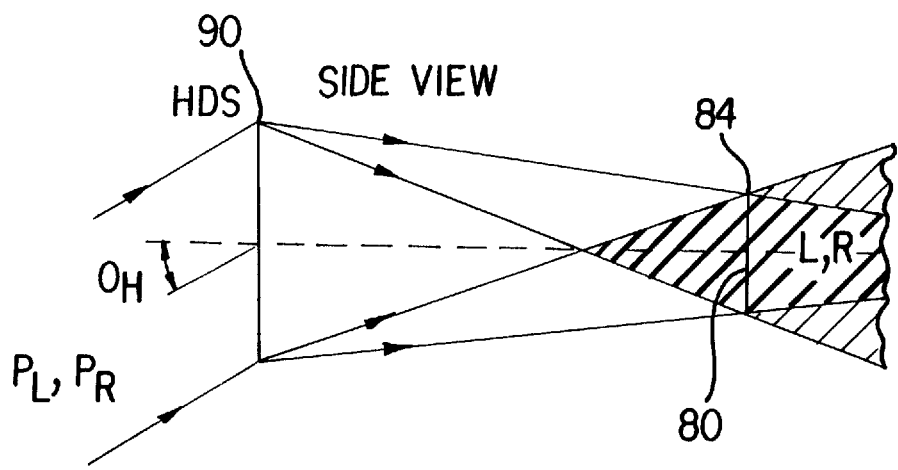
FIG. 8 illustrates a schematic side view of a viewing zone geometry according to the present invention.

Referring now to FIGS. 7 and 8, a detailed viewing zone geometry is shown. FIG. 7 is a top view and FIG. 8 is a side view. In this embodiment, the central viewing zone 80 is 10 inches wide and 5 inches high at the focal plane 84. The fan-out multiplexer 90 can be a holographic diffuse screen HDS.

3. Binary Head Tracking

Binary head tracking will be implemented using an electronic processing system to detect position of the head. The input image to the head tracker will be similar to that shown in FIGS. 9A, 9B and 9C. The thresholded outline 100 will be analyzed by the processor classifier. For simplicity, only three head positions are addressable from FIGS. 9A, 9B and 9C. Obviously, more head positions can be incorporated into the system. The viewer silhouette 110 is divided into two halves 111, 112 represented by the "R" "L." The input screen is divided into "R" and "L" regions. If the head "R" end "L" halves match "R" "L" requires the head tracker produces output "0" (no switching). If the head "R" end "L" halves do not match "R" "L" regions might be as shown in FIG. 9B. In this case the head tracker produces an output "1" forcing the switch to switch the video channels to match the viewer's eye positions. If the viewer moves even further, as shown in FIG. 9C, the switching algorithm will again switch the video channels.

An advantageous feature of the head tracker is a low resolution image. Assuming head movement is plus or minus 15 cm (horizontally) and an average eye separation of 7.5 cm, at least approximately three sets of "L" "R" zones should be provided for a look-around capability. See FIG. 10 where three (complete) sets of zones 121, 122, 123 will be appreciated to be providing 5 overlapping viewing zones

131, 132, 133, 134, 135. Assuming a required angular accuracy of approximately $\frac{1}{12}°$, the horizontal resolution should be approximately 90 pixels. The vertical resolution can be low (e.g., approximately 20 pixels). There is no need for vertical alignment. In consequence, the image to be processed is approximately 20 (vertical)×approximately 90 (horizontal) pixels.

Figure 11:
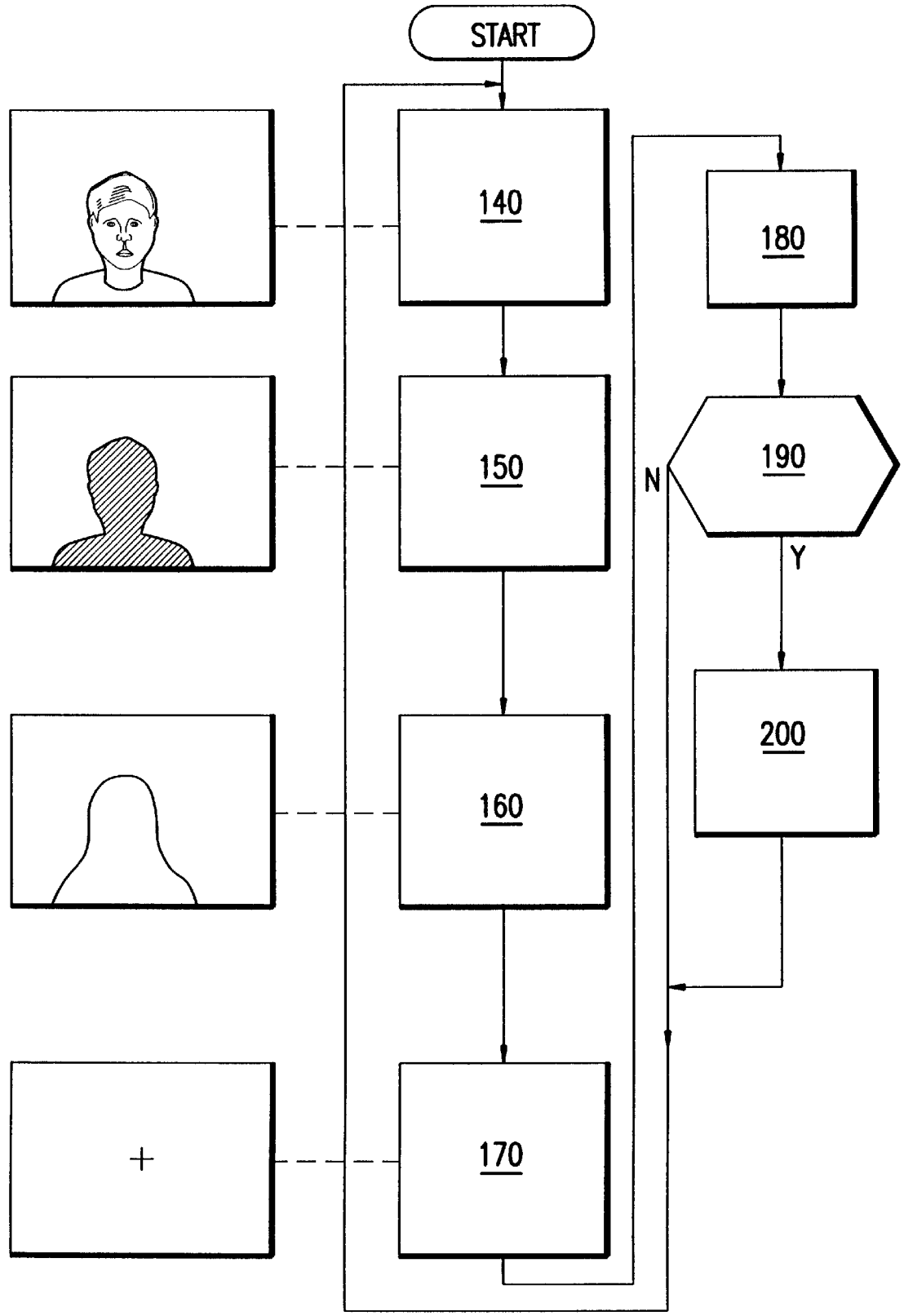
FIG. 11 illustrates a pictorially annotated flow chart of a head tracker input image processing method according to the present invention.

Referring to the flow diagram illustrated in FIG. 11, an analog signal is obtained from a black and white camera. This signal undergoes an image acquisition 140 grey scale operation having 32 levels. This results in a matrix of 20×90 pixels. Thresholding 150 is performed to segment the head position. A Fourier transform 160 is performed. The coordinates of the head position are determined 170. Zones are defined 180. It is determined if switching is required 190. If switching is required, data signals to the spatial light modulators are reversed 200. If switching is not required, data signals to the spatial light modulators are not reversed. The process then begins again.

The reason for reducing the resolution is to reduce computational overhead and be able to have the binary head tracker respond within a period less than the frame rate (e.g., 30 milliseconds). Referring again to FIG. 10, if the center of the head is within zones having an even designation (i.e., −2, 0, +2) no switching is required. If the center of the head is within zones having an odd designation, then switching is required. The switching has to be performed within signal frames to avoid the flickering affect.

4. LCD Driving Electronics

Figure 12:
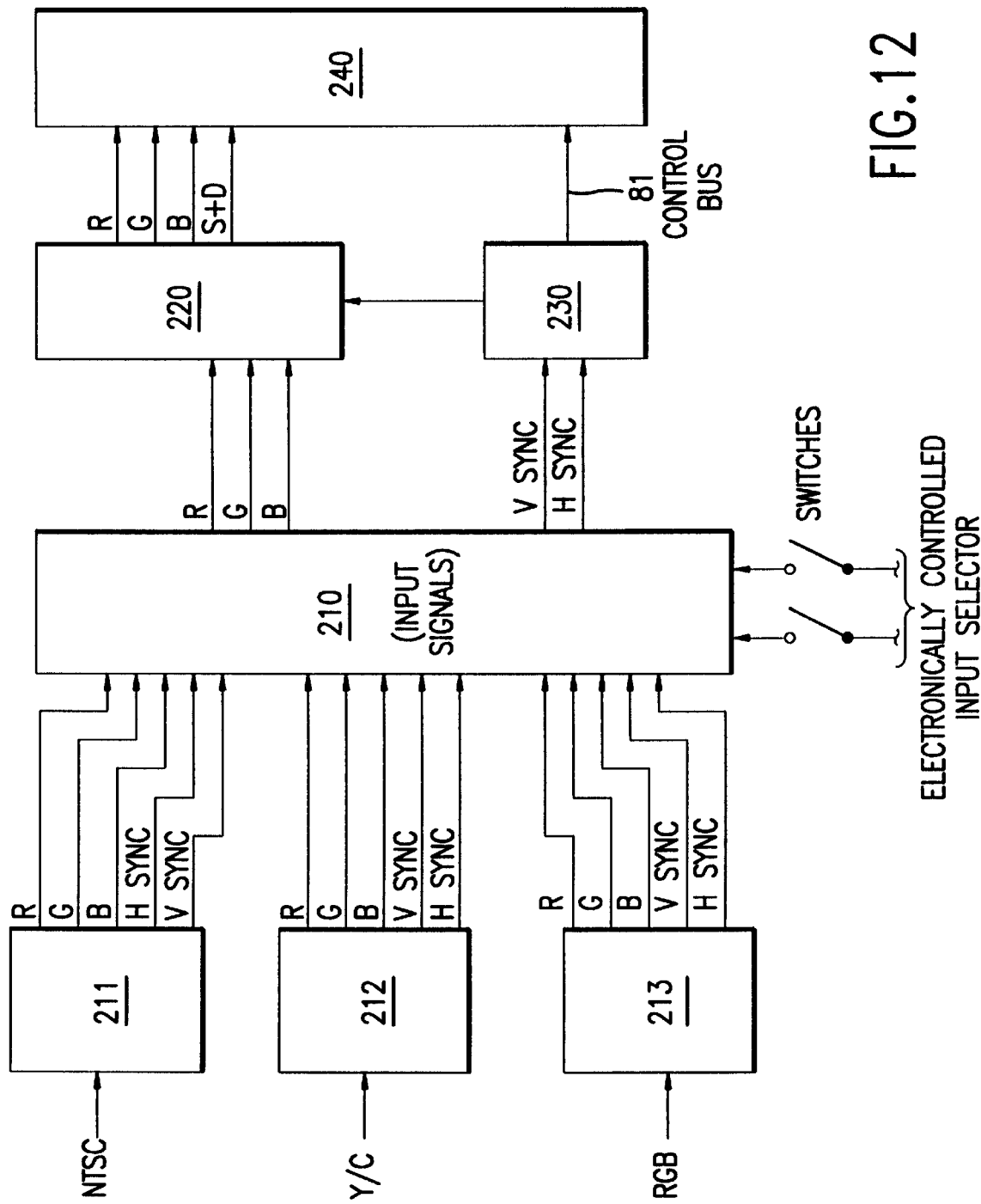
FIG. 12 illustrates a schematic view of an embodiment of signal input electronics according to the present invention.

The image signal can be stored in a memory or provided in real time with a pair of cameras. An image signal interface connects the video signal source to the spatial light modulator. Electronic drives for the 3-dimensional autostereoscopic monitor with direct viewing provides necessary interface between video signal sources (television cameras, video cassette recorders, laser disc players, and computers) and the liquid crystal display panels. Referring to FIG. 12, the input signal to the system can be in any of the following formats: (1) standard NTSC composite signal; (2) Y/C component signal; and (3) analog RGB signal. Each of the signals is interfaced through a dedicated interface subsystem. All of the input signals are converted to the RGB format which is the native format of the liquid crystal display panels. Each of the interface/decoder units 211, 212, 213 provides analog RGB output (three primary colors plus horizontal and vertical signals). These signals are connected to the input selector, for example, through a set of five 4-to-1 multiplexers 210.

The selector RGB channel are connected to the RGB driver 220 and V signal and H signal are connected to the timing generator. The timing generator 230 provides all synchronization for the liquid crystal display panel 240 and for the RGB driver 220. The timer signals for the liquid crystal display panel 240 are transferred as 8-bit control bus.

5. Recording of Multiplex Diffuse Holographic Screen

There will be N holograms multiplexed in a volume holographic material. For three color multiplexing and 2 or more perspectives, N will be greater than or equal to 6. In contrast, for a dispersion based full color image, N will be equal to the number of perspectives.

The diffuse perspective regions can be multiplexed in a thin film volume of material, each region being recorded with a different reference beam angle. Alternatively, the reference beam angle generally remains substantially fixed throughout the recording process.

By projecting the corresponding left and right perspectives of a scene simultaneously along the reference directions, a spatial sequence of perspective views is simultaneously reconstructed in the viewing zones defined by conjugate object beams, thereby providing a 3-D scene to an observer.

The exposure sequence can include a temporal series of exposures where the object beam angle is indexed. Alternatively, the exposure sequence can include a single exposure where the object beam is split to simultaneously define a plurality of object beam angles.

In addition, either of two reference beam directions corresponding to the projection angles for left and right images can be used, or one reference beam direction can be used. If one reference beam direction is used, then either of two reconstruction beam angles must be used, or the exposure sequence must include masking the object beam for either the left or right image and then masking the same object beam for the other image.

Using a single indexed object beam together with a single reference beam provides an unexpected improvement in efficiency of recording compared to splitting the object beam and/or splitting the reference beam. A particularly preferred method of recording includes the use of a single object beam that is indexed together with a single reference beam, where two reconstruction beams that converge with regard to one another are later used.

Figure 13:
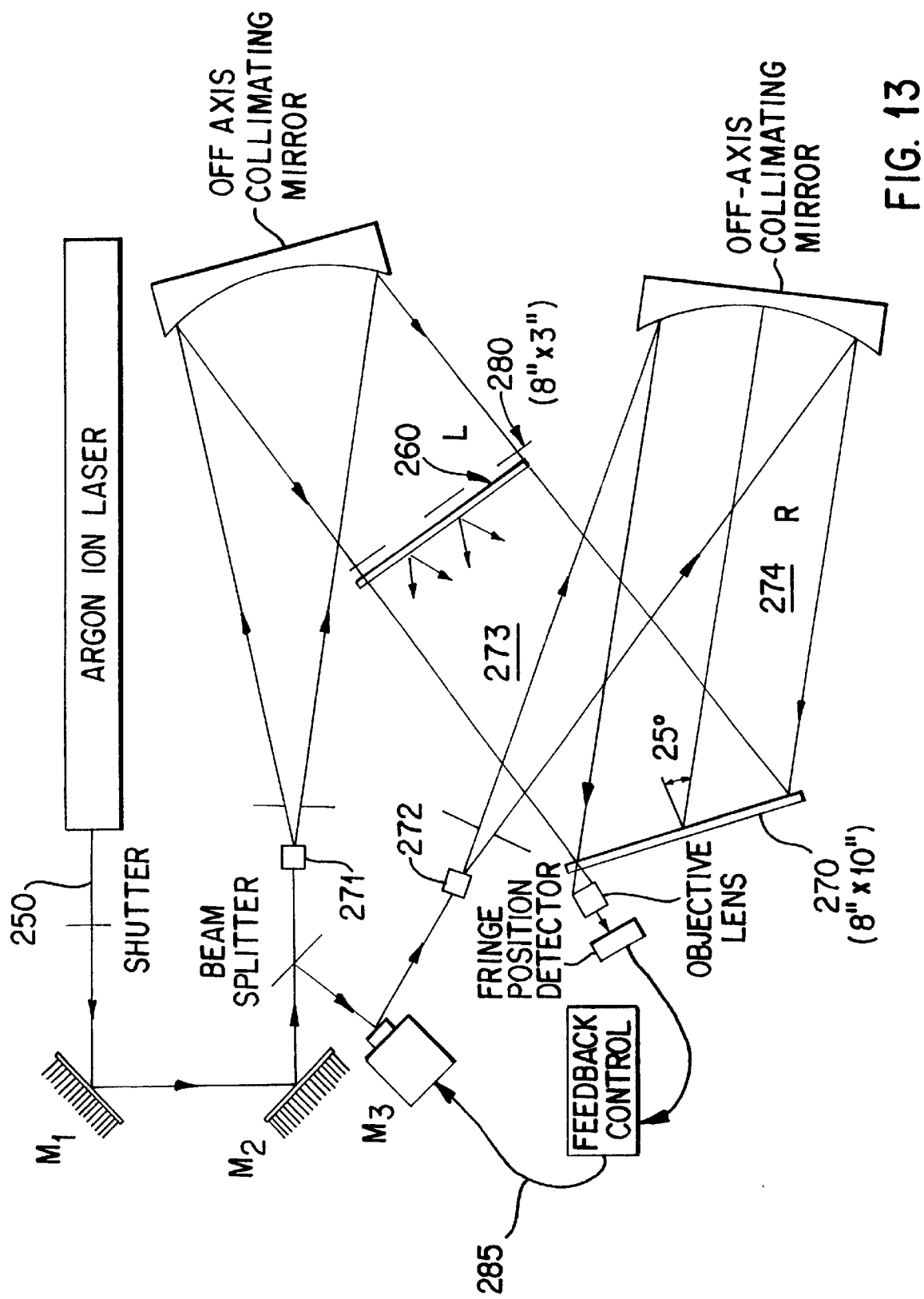
FIG. 13 illustrates a schematic view of a setup for recording the fan-out multiplexer according to the present invention.

A basic recording geometry is shown in FIG. 13. A laser beam 250 is split into object and reference beams 273, 274 and is expanded and collimated by lenses and spatial filters 271, 272. The object beam 273 illuminates a fine diffuser 260 (either ground glass or the holographic volume diffuser of U.S. Pat. No. 5,365,354, with a mask 280 pattern for either the left or right view regions. (It should be noted that although this recording method uses a mask 280, the mask 280 is not required if two converging reconstruction beams are subsequently used. The reference beam 274 converges from an off-axis point and illuminates the recording plate 270 from the opposite side. The interference fringes created by the two beams will be recorded as a complex volume grating in the recording medium. Since fringe stability to a fraction of a wavelength is required, an automatic fringe locking feedback mechanism 285 can be used to provide a longer exposure time without stability problems.

For each object beam angle, and the corresponding volume hologram, the beam angles and geometries will be different. Multiple exposures will be made on a single recording plate, using optimized recording parameters, which include exposure times of each hologram, the beam shape, angles and power ratios, etc. The portion of the object mask will depend on the required left and right view regions. Finally, the plate will be processed using predetermined processing parameters, such as the process time for each step, the temperature of processing baths, the temperature and time duration of post-baking, etc. The recording plate could also be a volume holographic recording plate.

6. Multiplexed Holographic Screen Theoretical Limitations

Figure 14:
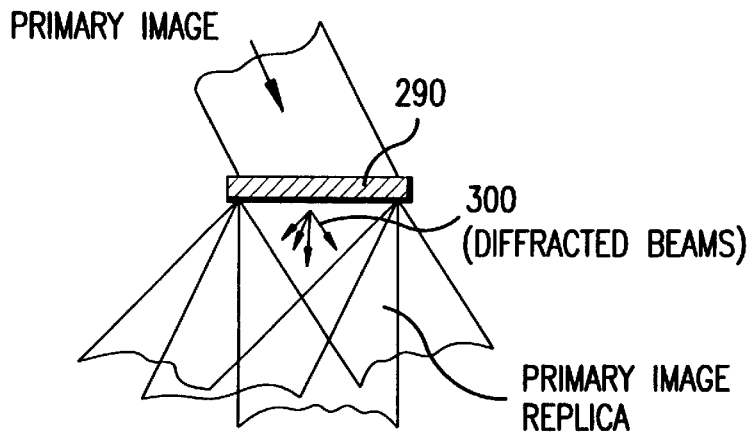
FIG. 14 illustrates a schematic view of a fan-out multiplexer according to the present invention.

Referring to FIG. 14, the fan-out capabilities of fan-out multiplexers (i.e, multiplex holographic screens). FIG. 14 is an illustration of a multiplex holographic screen 290, with a 1:4 fan-out 300.

Figure 15:
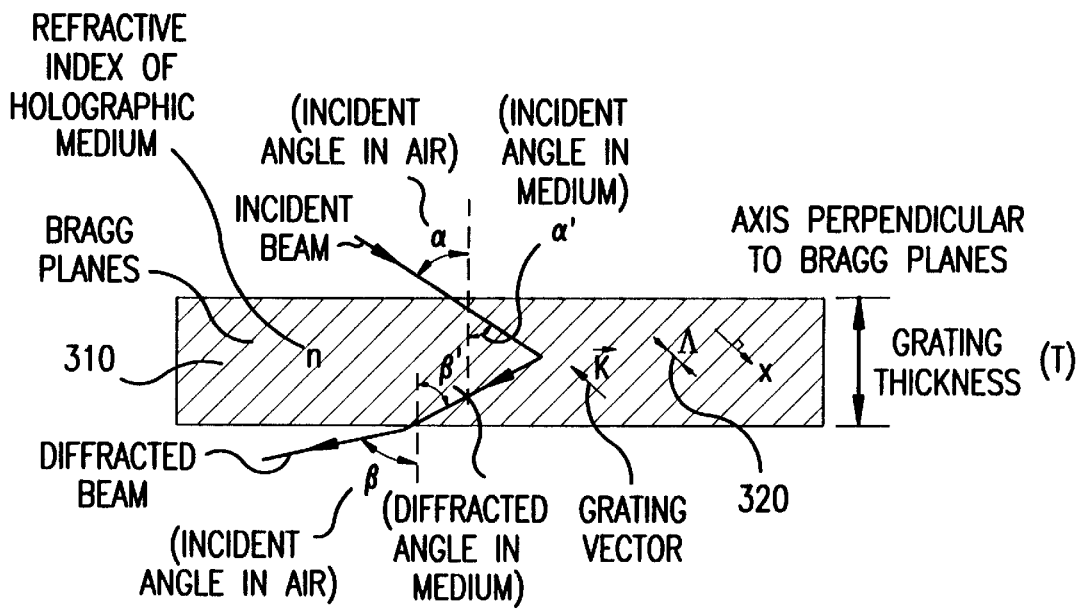
FIG. 15 illustrates a schematic view of an elementary volume holographic grating single-exposure case of a fan-out multiplexer according to the present invention.

FIG. 15 is an illustration of a volume holographic grating 310, as an elementary, single-exposure case of a multiplex holographic screen. Using the notation of FIG. 15, the grating constant 320, $\Lambda$, is $$\Lambda = \frac{\lambda}{2n} \frac{1}{\sin\left(\frac{\alpha' + \beta'}{2}\right)} \quad (100\text{-}1)$$

where $\alpha$, $\alpha'$, and $\beta$, $\beta'$ are incident and diffraction angles in air and in the medium, respectively. The average index of holographic medium in n, and optical wavelength is $\lambda$. The Snell relations are $$\sin \alpha = n \sin \alpha', \sin \beta = n \sin \beta' \qquad (100\text{-}2)$$

Figure 18:
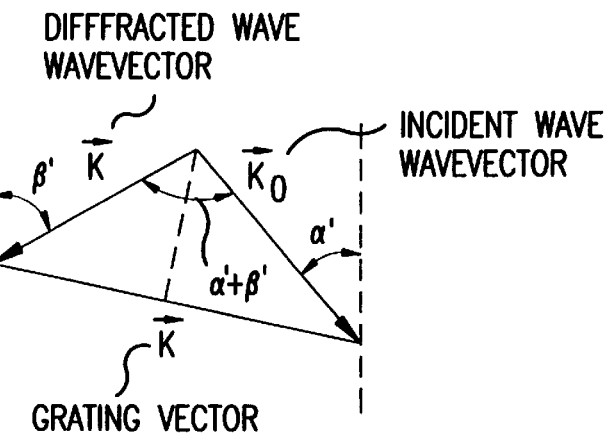
FIG. 18 illustrates a schematic view of a Bragg Triangle.

FIG. 18 is an illustration of a Bragg Triangles, where $\alpha'$, $\beta'$ are the angles illustrated in FIG. 15. The relation 100-1 has been derived based on FIG. 18. The fan-out of the multiplex holographic screen is due to the fact that this screen is based on volume holographic material, such as Du Pont photopolymer, Dichromated Gelatin (DCG), Polaroid DMP-128, or even embossed material but with large aspect ratio (which defines the ratio between vertical details and horizontal details). In order to have fan-out, what is required is: 1) sufficiently large separation between fan-out beams, to avoid crosstalk and 2) sufficiently high diffractive efficiency, for each diffracted beam (minimum of approximately 50%).

Diffraction efficiency analysis for elementary volume holographic gratings is given by H. Kogelnik, The Bell System Technical Journal, Vol. 48, Nov. 1969, pp. 2909–2947. The unwanted crosstalk effects have been discussed by S. K. Case, J. Opt. Soc. Am. 65, pp. 724–729 (1975), and by R. Kowarschik, in Optica Acta 25, 67–81 (1978), and in Opt. and Quant. Electr. 10, 171–178 (1978). The criterion of volume holograms has been introduced by W. Klein in Proc. Lett. IEEE, 803–804, May 1966.

There should be sufficiently large separation between fan-out beams, to avoid crosstalk. For a symmetrical case, $\alpha = \beta$ and Eq. (100-1) reduces to $$\Lambda = \frac{\lambda}{2\sin\alpha} \qquad (100\text{-}3)$$

The minimum angular separation between two fan-out beams, $\delta\Theta$, in order to avoid crosstalk is $$\delta\theta = \frac{2C_S \cdot \Lambda}{T} \frac{1}{\sqrt{1 - \left(\frac{\lambda}{2n\Lambda}\right)^2}} \qquad (100\text{-}4)$$

where $C_s = \cos \beta'$ and T=thickness. For the symmetrical case, the formula (100-4) reduces to (T–THICKNESS).

$$\delta\theta = \frac{2\Lambda}{T} \qquad (100\text{-}5)$$

Assuming the angular range $\Delta\Theta$, of 45°, or $\pi/4$, the maximum number of fan-out beams (within 45° angular range), is $$N_A = \frac{\lambda T}{8\Lambda} \qquad (100\text{-}6)$$

and the Klein criterion is (for $\alpha = \beta$):

$$Q = \frac{2\pi\lambda T}{n\Lambda^2} = \frac{8\pi T}{\lambda n} \sin^2\alpha > 10 \qquad (100\text{-}7)$$

These relations are presented in Table 1, for $\lambda=0.5\ \mu m$, and $T=20\ \mu m$, and $n=1.55$ (a typical value of refractive index for volume holographic materials). The Klein parameter, Q, is always>10, except $\alpha=5°$. Thus, for $\alpha>6°$, the presented holographic structures are volume. The number of fan-out beam grows up to 26, for $\alpha=45°$, an unexpectedly very good result.

Figure 17:
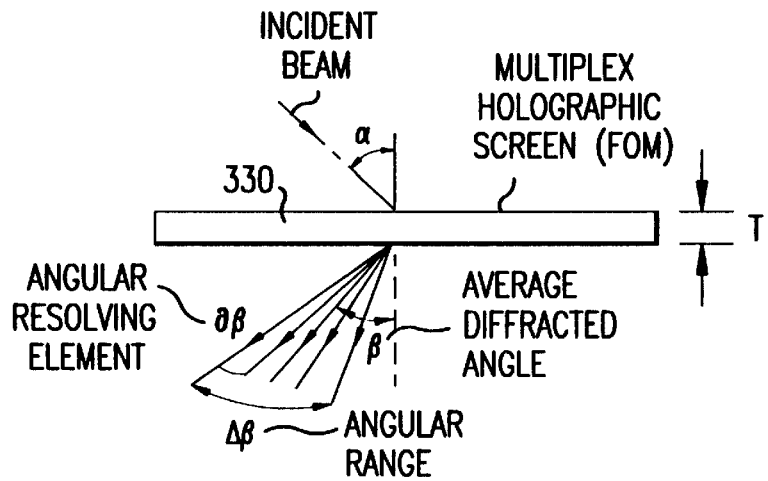
FIG. 17 illustrates a schematic view of angular fan-out according to the present invention.

FIG. 17 is an illustration of angular fan-out, produced by a multiplex holographic screen 330, (i.e., FOM). The minimum angular separation of fan-out beams, maximum number of fan-out beams, (for angular range–45°), granting constant, and Klein parameter, for various incident angles, in symmetrical geometry ($\alpha=\beta$, as in FIG. 17); $\lambda=0.5\ \mu m$, $n=1.55$, $T=20\ \mu m$ are given in Table 1.

TABLE 1

| $\alpha$ | 5° | 10° | 15° | 20° | 25° | 30° | 35° | 40° | 45° |
|---|---|---|---|---|---|---|---|---|---|
| $\Lambda(\mu m)$ | 2.86 | 1.43 | 0.96 | 0.73 | 0.59 | 0.5 | 0.43 | 0.38 | 0.35 |
| $\delta\theta$(Rad.) | 0.29 | 0.14 | 0.1 | 0.07 | 0.06 | 0.05 | 0.04 | 0.04 | 0.03 |
| $\delta\theta$ | 16° | 8° | 5.5° | 4° | 3.4° | 2.9° | 2.5° | 2.2° | 2° |
| Q | 4.5 | 20 | 43 | 76 | 115 | 162 | 213 | 268 | 324 |
| $N_A$ | 2 | 5 | 7 | 11 | 13 | 15 | 19 | 20 | 26 |

Figure 16:
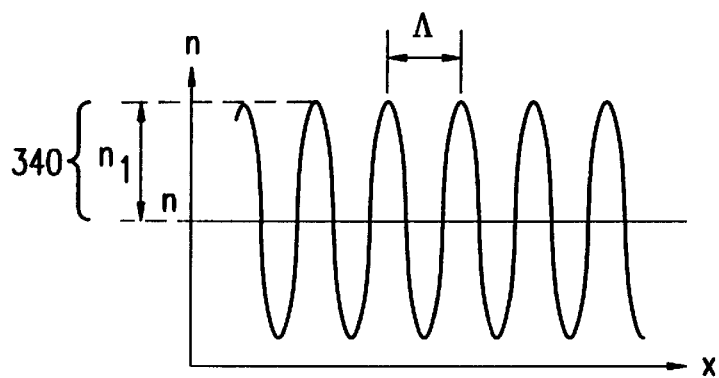
FIG. 16 illustrates refractive index as a function of scalar position in an elementary single-exposure case of a fan-out multiplexer according to the present invention.

The second limitation of maximum fan-out comes from the diffraction efficiency limitation. FIG. 16 is an illustration of refractive index modulation for elementary volume holographic grating, with a medium refractive index, n, index modulation, $n_1$, and grating constant $\Lambda$. Note that the perpendicular (to Bragg planes) axis-x, is shown in FIG. 15. In order to obtain, sufficiently high diffraction efficiency, for each fan-out beam, we need to have sufficiently high index modulation 340, (as in FIG. 16), and large thickness, T, according to Kogelnik formula, which for the 50% efficiency condition, for each fan-out beam, has the form:

$$n_1 = \frac{\lambda \sqrt{C_R C_S}}{4T} \qquad (100\text{-}8)$$

where $n_1$ is minimum index modulation (shown in FIG. 16); $C_R = \cos \alpha'$, $C_s = \cos \beta'$. For symmetrical case ($\alpha = \beta$), the maximum number of fan-out beams, coming from diffractive efficiency limitations is $$N_D = \frac{4T\Delta n}{\lambda C} \qquad (100\text{-}9)$$

where $C_R = C_S = C$, and $\Delta n$ is maximum index modulation of the material. For example, for $T=20\ \mu m$ (typical thickness), $\Delta n=0.1$ (achievable by DCG), $\alpha=45°$, we obtain $C=0.89$, and $N_D=18$; i.e., smaller than $N_A$, for the same angle of incidence from Table 1 ($N_A=26$, for $\alpha=45°$). Thus, the maximum number of fan-out beams, is $$N_{max} = \min\{N_A, N_D\} \qquad (100\text{-}10)$$

which is smaller of ($N_A$, $N_D$), is usually limited by diffraction efficiency.

7. Design Procedure

These are general rules how to design multiplex holographic screens with a large number of fan-out beams. The following input parameters should be considered.

Input Parameters:

T Screen Thickness $\Delta n$ Maximum Index Modulation (Material Property)

n Average Index (Material Property)

$\lambda$ Optical Wavelength (approx. 0.5 $\mu m$, for visible; 1 $\mu m$, for near IR)

$\alpha, \beta$ Angles (geometry of the system)

Similarly, the following design sequence should be considered, although many alternatives exits.

Design Sequence:
1) Check relation (100-7), must be Q>10
2) Calculate relation (100-6)
3) Calculate relation (100-9)
4) Check relation (100-10), to obtain $N_{max}$ As noted above, there should be sufficiently large separation between fan-out beams, to avoid crosstalk. If the system is diffraction-efficiency-limited (which is usually the case; i.e., $N_D<N_A$), then $$N_{max}=N_D \tag{100-11}$$

and angular separation can be larger than that from (100-4).

According to the first limitation, sufficiently high diffraction efficiency, for each diffracted beam (minimum 50%) must be achieved. If system is geometry-limited, however, then $N_A<N_D$, and $$N_{max}N_A \tag{100-12}$$

8. Screen Enhancement

A primary screen enhancement goal is efficiency enhancement. For large hologram recording, an enhancement of efficiency may be required because of the lower available laser power per unit area. This enhancement can involve the following two steps: (1) record a first step hologram at the required wavelengths using highly sensitive recording material (such as silver halide), and then (2) contact copy the first hologram onto a less sensitive, but high efficiency, low noise recording material such as dichromated gelatin DCG or Du Pont photopolymer. See FIGS. 24 and 25. The second step is simple because only one expanded laser beam is required.

Another screen enhancement goal is aberration correction. Because holograms are usually recorded at one wavelength (i.e., the He—Ne wavelength of 633 nm for silver halide material or the Argon 514 nm for DCG material) and reconstructed at another (i.e., RGB wavelength commonly used for color display), an aberration correction method may be required. This correction can be obtained using recursive methods that are known as general mathematical techniques.

Figure 19:
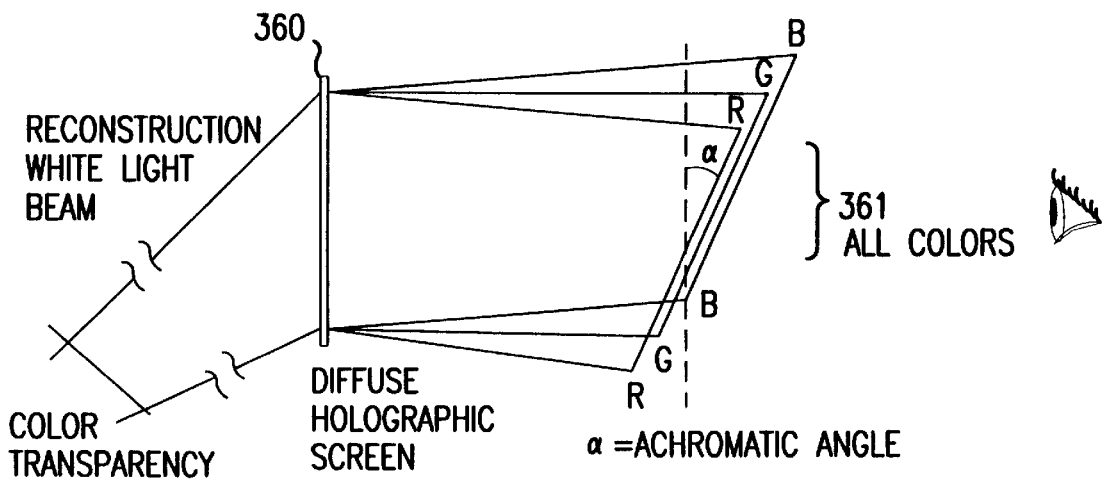
FIG. 19 illustrates a schematic view of a full color viewing using the dispersion property of a fan-out modulator according to the present invention.

Yet another screen enhancement goal is a dispersion-based full color display. By using the chromatic dispersion of holograms, full color holographic diffuse screens can be achieved. The number of multiplexed holograms will be equal to the number of perspectives (N) required (as compared to 3N holograms required in 3-wavelength RGB multiplexing). When a white light source is used to reconstruct a transmission hologram with broad spectral bandwidth, spectral dispersion occurs, focussing different colors at different locations. The angle between the line joining the focus points and the vertical is called the achromatic angle. The diffuse holographic screen 360, FOM in FIG. 19 can be tilted through the achromatic angle when recording each volume hologram. Reference beams can be arranged so that dispersion occurs solely on the vertical axis. When such a hologram is reconstructed with a white light reference projection beam (e.g., a full color scene from a standard projector), the colored images of the diffuse plane will overlap but they will be shifted along the achromatic direction. If the diffuser area is sufficiently large vertically, the large center region 361 will provide full color viewing. In contrast to holographic imaging, no smearing of the image occurs, because projection images are focussed onto the screen. This concept is illustrated in FIG. 19 which is a schematic illustration of full color viewing using the dispersion property of a diffuse holographic projection screen.

9. Material Selection and Processing

The following holographic recording materials can be used for recording high efficiency holographic images in volume: silver halide, dichromated gelatin, Du Pont photopolymer, Polaroid DMP-128, Physical Optics Corporations's composite-graft polymer, etc. In order to obtain high efficiency holograms, each of the material is processed differently. Optimum process recording and processing conditions are very critical because of the requirement of sensitivity, dynamic range and reproducability of each material are different. For example silver halide is extremely sensitive. The micro joule range energy level is sufficient to obtain high efficiency whereas dichromated gelatin requires 100 to 200 m joule per unit area energy depending upon the sensitizer concentration, thickness of the film and age of the film. If all these factors are balanced, the efficiency of the resultant diffuser screen will still not be optimized unless the optimum process is carried out. The FOM should be exposed and processed so the maximum efficiency and image brightness are achieved.

EXAMPLES

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Example 1

1. Holographic recording material→silver halide
2. Size of the recording plate→13"×13"
3. Angle of exposure→30°
4. Processing→30 to 120 sec. with immediate deionized water wetting
5. Exposure source→10 $\mu$j to 200 $\mu$j
6. Number of slits used during exposure→2–4
7. Exposure source→Argon Ion laser $\lambda$=514 nm
8. Resolution→5000 lines/mm Example 2

1. Holographic recording material→Dichromated gelatin
2. Size of the plate→10→×12"
3. Thickness of the coating→8–20 microns
4. Angle of exposure→20°–30°
5. Exposure source→Argon Ion laser $\lambda$=514 nm
6. Number of slits used during exposure→2–5
7. Exposure energy→100–200 mj
8. Processing condition→multiple steps
9. Resolution→5000 lines/mm The multiple processing steps will now be discussed in more detail. In order to obtain high brightness with a high efficiency diffuser so that the 3-D image can be highly resolved, the exposed dichromated gelatin plates have to be optimally processed. Optimum processing conditions involve varying the processing conditions according to dichromated gelatin thickness variation, age of the film and dark reaction. The processing method involves dipping the exposed plate into to fixer solution (30 seconds to 3 minutes), swelling the film in cold deionized water (15 seconds to 3 minutes) and progressively dehydrating it by dipping the plate into a bath of isopropyl alcohol/water mixture (75 Water/25 Alcohol, 50 Water/50 Alcohol, 25 Water/75 Alcohol, 100 Alcohol (Cold) and 100 Alcohol/65° C.). The duration and dipping of the plate in the alcohol/water mixtures depends upon the exposure conditions, hardness of the film, swelling to the film and fixing time. For example if the film is too soft, it should be fixed for a relatively longer time than if the film is hard. If the hard is swelled too long, it should be processed through the alcohol bath rather slowly (i.e., dipping of the plate in alcohol bath can be as long as 2 minutes each). If the film is hard or not swelled too much, the 15–20 second dipping in each alcohol bath may be sufficient. It should be noted that producing high efficiency diffuse having high brightness is not easy or trivial. The process for producing a high efficiency diffuser screen using composite graft polymer is very similar to that used for dichromated gelatin. The advantage of using composite graft polymer as there holographic recording material is that grafting induces extra strength and stability to the end product. All four of the holographic materials: silver halide, dichromated gelatin, composite graft polymer and Polaroid DMP-12 g require wet processing.

However, Du Pont photopolymer does not require wet processing. A dry processing involving ultraviolet exposure and heat is sufficient to process the Du Pont film. The process of producing diffuser screen using Du Pont material is illustrated in the following example.

Example 3

1. Holographic recording material→Du Pont Omnidex
2. Thickness of the film→5 mm to 20 mm
3. Size→8"×10"
4. Exposure angle→10°–30°
5. Exposure energy→10–100 mj/cm
6. Number of slits→2–5
7. Resolution→5000 lines/mm
8. Exposure source→Argon Ion λ=514 nm
9. Processing conditions→UV and heating The Du Pont photopolymer after recording needs UV processing. UV processing involved exposing the recorded plate to UV radiation at 365 nm at 1 mwatt/cm² for 30 minutes to 1 hour. UV curing is followed by heat treatment of the film in a forced air convection oven at about 100° C. for 15 minutes to 90 minutes. The heat treatment enhances the image brightness as well as keeping the desired bandwidth range. In a high volume production system a tunnel oven could be used so that the film could be continuously rolled in and out of the oven before it is cut to required sizes to fit the application needed.

Highly broadband, high efficiency, multiplexed volume transmission holograms can be produced with average efficiencies of 90% within a wide-band width of 200 nm. Further, optimization of holographic recording and processing can be used to obtain uniformly high diffraction efficiencies of transmission hologram over a broader spectral band. Efficiencies of about 98% and only one diffraction order over a broad spectrum of up to 500 nm in both the visible and near infrared spectral regions can be obtained.

There are, for example, two approaches for obtaining broadband volume holographic results at these levels. The first approach is based on Bragg structures with vertical grating constant nonuniformities. The second approach involves the broadening of the grating's spectral response by multiplexing using multiple exposures from a single master hologram.

Figure 20:
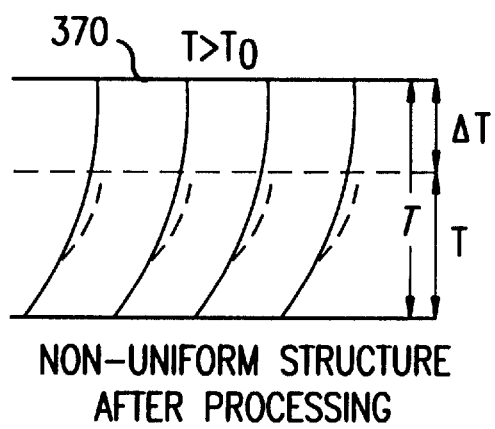
FIG. 20 illustrates a schematic view of a transmission Bragg structure with vertical grating constant non-uniformities.
Figure 21:
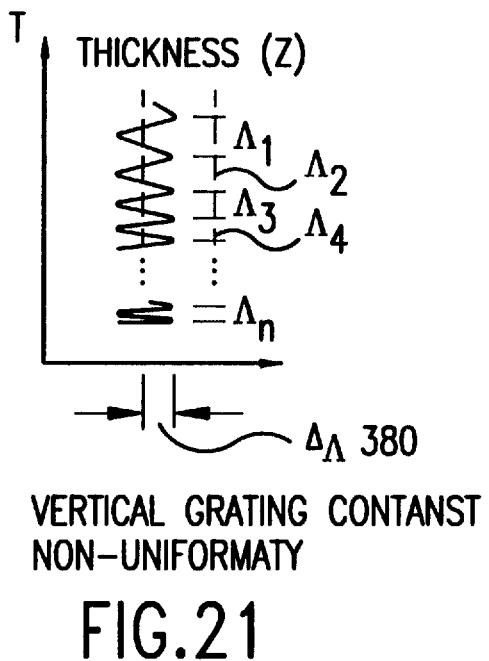
FIG. 21 illustrates a schematic view of a reflection Bragg structure with a nonuniform vertical grating constant.
Figure 22:
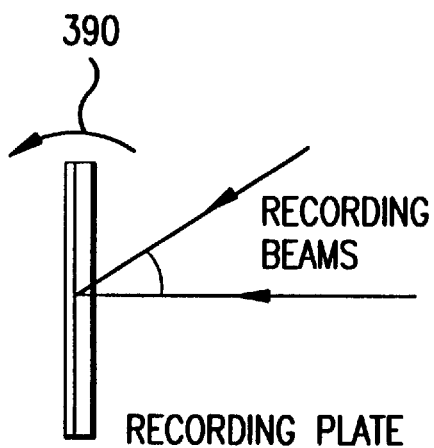
FIG. 22 illustrates a schematic view of a geometry for multiplexed recording of a broadband fan-out modulator according to the present invention.
Figure 23:
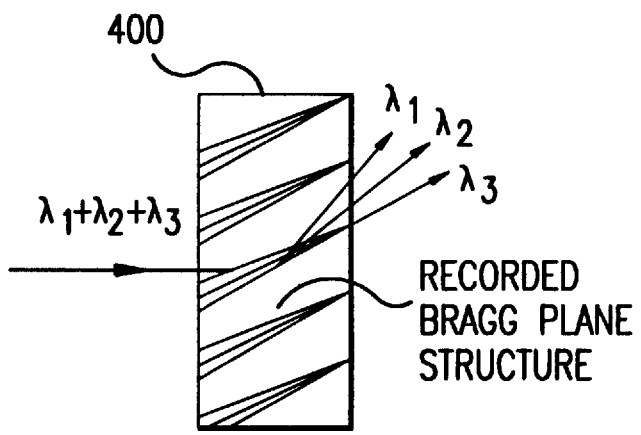
FIG. 23 illustrates a schematic view of multiplexed Bragg plane structures in a fan-out modulator according to the present invention.

Non-uniform Bragg plane structures obtained with the above-described processing technique are shown in FIGS. 20–23. FIG. 20 illustrates transmission Bragg structure 370 with vertical grating constant non-uniformities. FIG. 21 illustrates reflection Bragg structure with non-uniform vertical grating constant 380. FIG. 22 illustrates a geometry for multiplexed recording of broadband hologram with small angle tilt 390 of recording plate. FIG. 23 illustrates the multiplexed Bragg plane structures 400 achieved with the geometry illustrated in FIG. 22.

Figure 24:
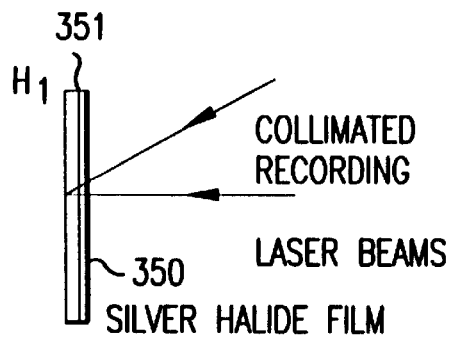
FIG. 24 illustrates a schematic view of recording a mask according to the present invention.
Figure 25:
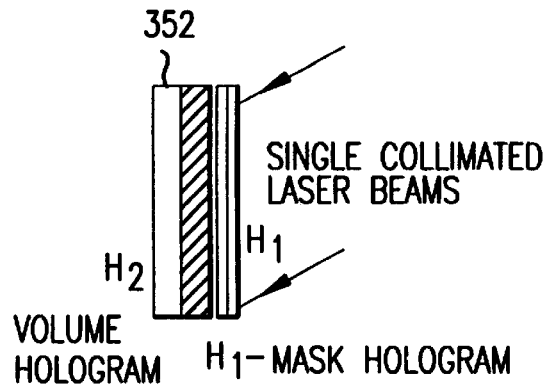
FIG. 25 illustrates a schematic view of recording Bragg structure in volume holographic medium by single beam contact printing according to the present invention.

For production purposes, the hologram fabrication technology can be extended to achieve laser replication from a single holographic master. This method is illustrated in FIGS. 24–25, where the master hologram is first produced using two-beam recording, and then replicated using a single laser beam. This method is very convenient for obtaining production efficiency and commercialization, because it allows for rapid replication of the original high-precision holographic structure.

FIGS. 24–25 illustrate a two step hologram multiplexing method. FIG. 24 illustrates recording of a master hologram 351 (mask). FIG. 25 illustrates recording of Bragg structures in volume holographic medium 352 by single beam contact printing.

10. Key Stone Distortion Minimization and Compact Reconstruction Geometry

The present invention includes a compact reconstruction geometry which unexpectedly provides Key Stone distortion minimization. In general, in autostereoscopic 3-D a white light beam which has not been modulated by a liquid crystal television illuminates the holographic screen. See FIG. 26. In order to have high diffraction efficiencies, the angle between incident beam and the screen is not 90°. The angle between the incident beam and the screen is preferably at least approximately 30°. The use of an approximately 30° causes the undesirable key stone effect (projector focal plane and screen are not parallel to each other), causing geometrical distortions. This effect can be compensated for by using a compound HOE 410 as shown in FIG. 27.

Figure 26:
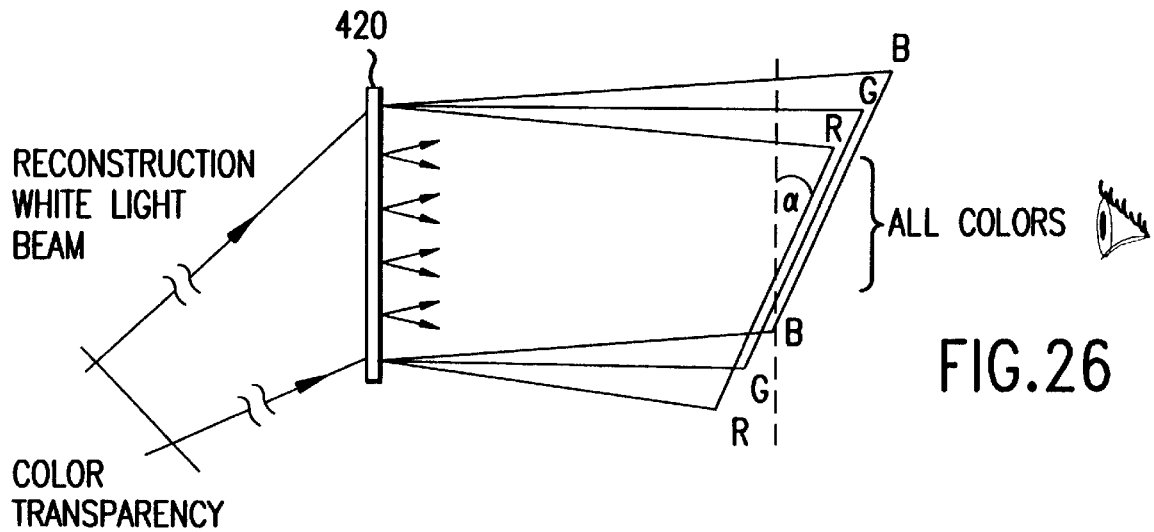
FIG. 26 illustrates a schematic view of a fan-out multiplexer geometry according to the present invention.

Full color viewing is unexpectedly improved using the dispersion compensating property of compound holographic optical elements. Referring to FIG. 26, a single diffuse holographic screen 420 is used. The key stone distortion is manifested by a separation of red, green and blue spectral images.

Figure 27:
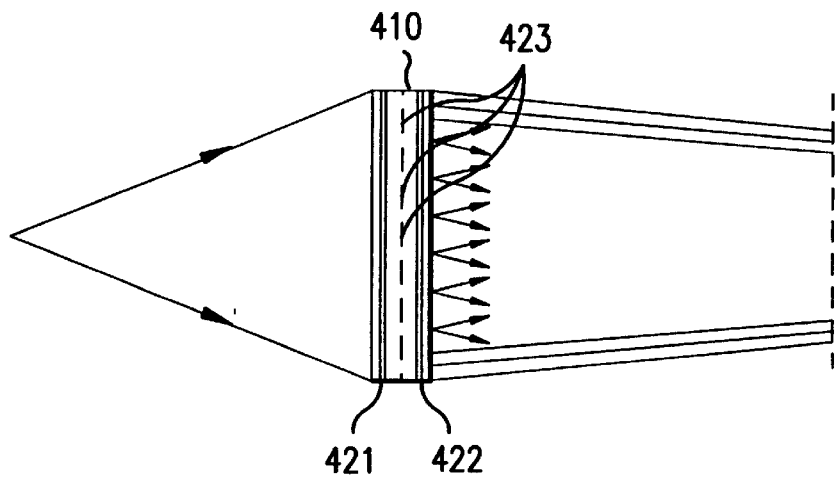
FIG. 27 illustrates a schematic view of a compensated fan-out multiplexer geometry according to the present invention.

Referring to FIG. 27, two holographic optical elements, (i.e., $H_1$, and $H_2$, 421, 422) are used resulting in chromatic aberration for full color image view region without key stone distortion. The elements can be physically attached to one another with small parallel webs, microscopic blinds or microlouvers 423.

All the disclosed embodiments are useful in conjunction with 3-D displays such as those which could be used for the purpose of taking pictures with a stereoscopic robot having two cameras defining the locations (left, right) of the robot's "eyes." This would enable the transmission of exact 3-D replicas of the photographed scenes, for viewing by human observers, whose eyes would be in locations (left, right) corresponding to the stereoscopic robot's "eyes." There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which presents a plurality of images so as to provide autospectroscopy. Although the display system described herein is a physically separate module, it will be manifest that the display system may be integrated into the apparatus with which it is associated. Further, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. An autostereoscopic display system comprising:
   I) image signal electronics;
   II) a first projector including:
      A) a first light source;
      B) a first spatial light modulator optically connected to said first light source and electrically connected to said image signal electronics, said first spatial light modulator defining a first spatial light modulator normal axis; and
      C) a first image delivery system optically connected to said first spatial light modulator;
   III) a second projector connected to said first projector, said second projector including:
      A) a second light source;
      B) a second spatial light modulator optically connected to said second light source and electrically connected to said image signal electronics, said second spatial light modulator defining a second spatial light modulator normal axis, said second spatial light modulator normal axis being spatially multiplexed apart from said first spatial light modulator normal axis to define a spatial light modulator separation distance; and
      C) a second image delivery system optically connected to said second spatial light modulator;
   IV) a fan-out multiplexer optically connected to both said first image delivery system and said second image delivery system, said fan-out multiplexer being characterized by a viewing zone period and a viewing region period, wherein images from said first and second delivery systems are delivered substantially simultaneously; and
   V) a binary head tracker electrically connected to said image signal electronics, said binary head tracker including a camera and a circuit board.

2. The autostereoscopic display system of claim 1 further comprising:
   I) a pair of optical fibers connected to said image signal electronics; and
   II) an endoscope connected to said pair of optical fibers.

3. The autostereoscopic display system of claim 1, further comprising an off-axis collimator that is 1) optically connected between a) both i) said first image delivery system and ii) said second image delivery system and b) said fan-out multiplexer and 2) coextensive with said fan-out multiplexer.

4. The autostereoscopic display system of claim 1, wherein said fan-out multiplexer is a surface fan-out multiplexer.

5. The autostereoscopic display system of claim 1, where said first spatial light modulator normal axis is substantially parallel with said second spatial light modulator normal axis.

6. The autostereoscopic display system of claim 1, where said first spatial light modulator normal axis and said second spatial light modulator normal axis converge toward said fan-out multiplexer.

7. The autostereoscopic display of claim 1 wherein said binary head tracker effects switching of data signals from said signal electronics in response to a change in position of a viewer of said autostereoscopic display system.

8. The autostereoscopic display system of claim 1 wherein said fan out multiplexer comprises a hologram.

9. The autostereoscopic display system of claim 1 wherein said fan out multiplexer comprises N volume holograms of diffused perspective regions, one for each perspective view zone.

10. The autostereoscopic display system of claim 9 wherein said fan out multiplexer further comprises each perspective view zone being multiplexed in a thin film volume of material.

11. An autostereoscopic display system comprising:
   I) image signal electronics;
   II) a first projector including:
      A) a first light source;
      B) a first spatial light modulator optically connected to said first light source and electrically connected to said image signal electronics, said first spatial light modulator defining a first spatial light modulator normal axis; and
      C) a first image delivery system optically connected to said first spatial light modulator;
   III) a second projector connected to said first projector, said second projector including:
      A) a second light source;
      B) a second spatial light modulator optically connected to said second light source and electrically connected to said image signal electronics, said second spatial light modulator defining a second spatial light modulator normal axis, said second spatial light modulator normal axis being spatially multiplexed apart from said first spatial light modulator normal axis to define a spatial light modulator separation distance: and
      C) a second image delivery system optically connected to said second spatial light modulator;
   IV) a fan-out multiplexer optically connected to both said first image delivery system and said second image delivery system, said fan-out multiplexer being characterized by a viewing zone period and a viewing region period; and
   V) a binary head tracker electrically connected to said image signal electronics, said binary head tracker including a camera and a circuit board wherein said fan-out multiplexer includes a holographic medium having a grating constant, $\Lambda$, wherein the grating constant, $$\Lambda = \frac{\lambda}{2n} \frac{1}{\sin\left(\frac{\alpha' + \beta'}{2}\right)}$$

where $\alpha, \alpha'$, and $\beta, \beta'$ are incident and diffraction angles in air and in the medium, respectively, n is the average index of holographic medium and $\lambda$ is the optical wavelength.

12. The autostereoscopic display system of claim 11 wherein images from said first and second image delivery systems are delivered to a viewer substantially simultaneously.

* * * * *

UNITED STATES PATENT AND TRADEMARK OFFICE
CERTIFICATE OF CORRECTION

PATENT NO.   : 5,886,675
DATED        : Mar. 23, 1999
INVENTOR(S)  : Aye et al.

It is certified that error appears in the above-identified patent and that said Letters Patent is hereby corrected as shown below:

Title page, below "Primary Examiner" insert Attorney, Agent or Firm -- Nilles & Nilles, S.C.--.

Col. 11, Equation (100-6) should read $N_A = \frac{\pi T}{8\Lambda}$.

Col. 14, line 46, delete "10 → x 12"" and replace with --10" x 12"--.

Signed and Sealed this

Fifth Day of December, 2000

Q. TODD DICKINSON

Attest:

Attesting Officer

Director of Patents and Trademarks